No. 775,112. PATENTED NOV. 15, 1904.
J. B. MAHANA.
VOTING MACHINE.
APPLICATION FILED MAY 25, 1903.
NO MODEL. 9 SHEETS—SHEET 1.
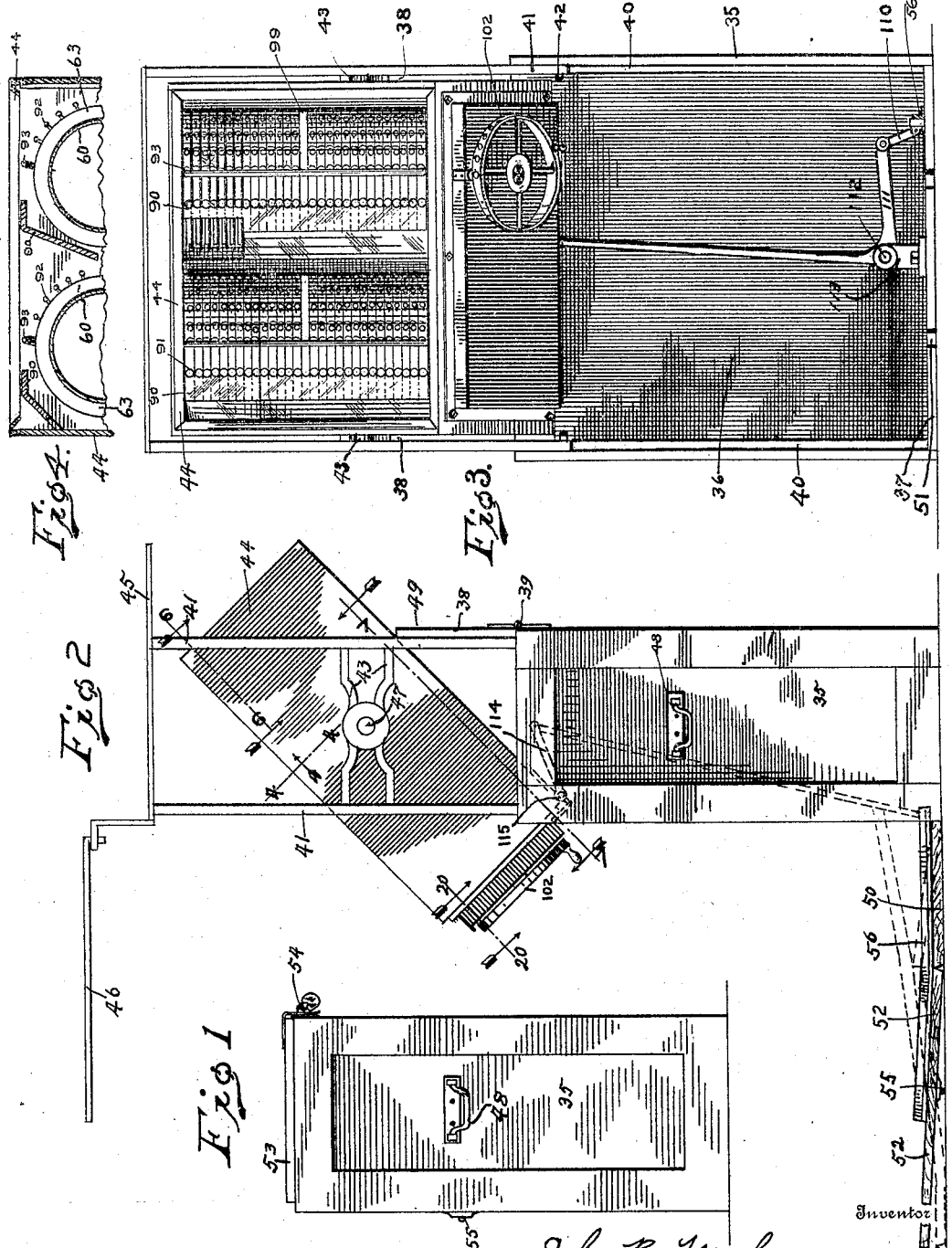
Witnesses
Inventor
John B. Mahana
By W. H. Lockwood
Attorney

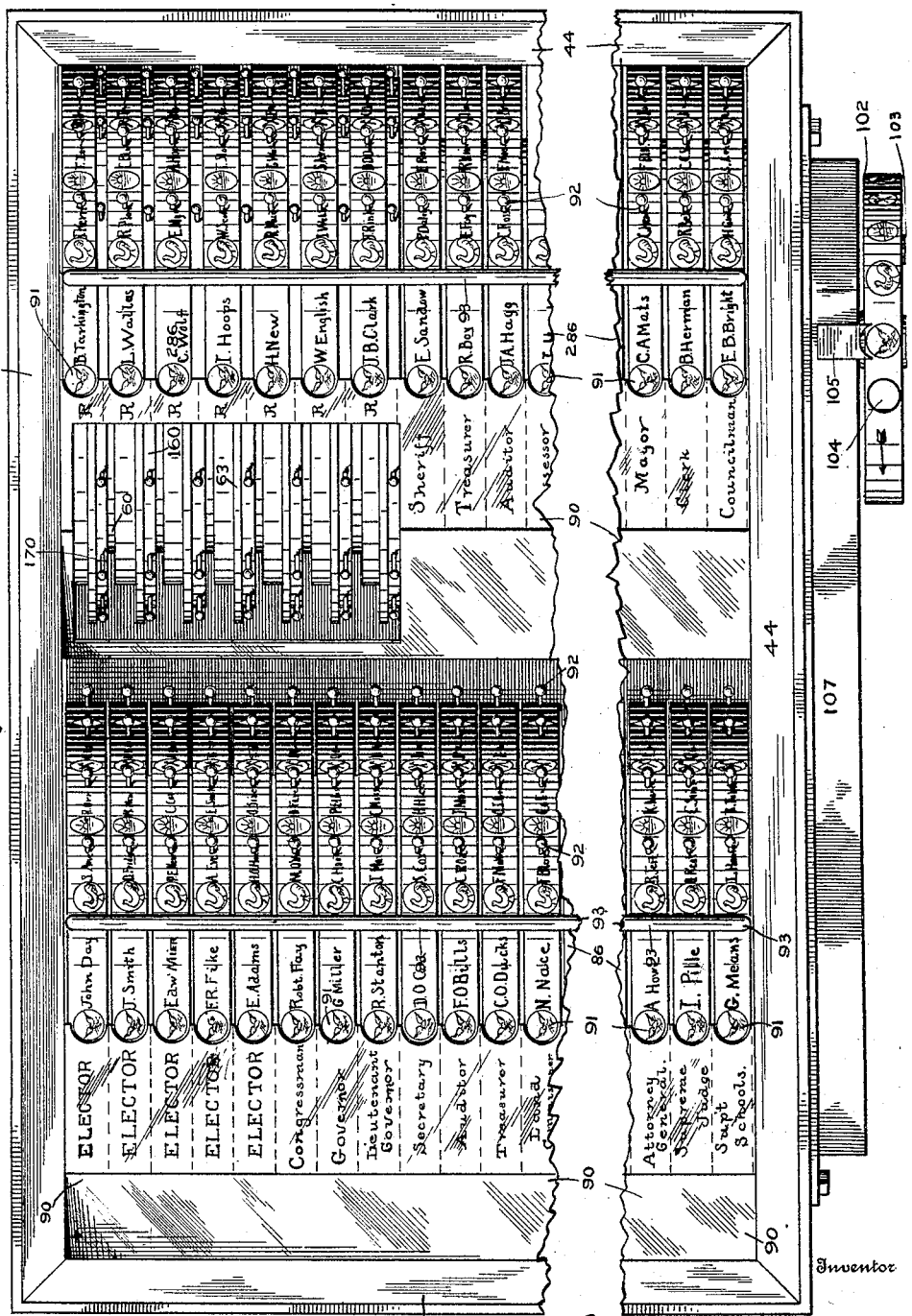

No. 775,112. PATENTED NOV. 15, 1904.
J. B. MAHANA.
VOTING MACHINE.
APPLICATION FILED MAY 25, 1903.
NO MODEL. 9 SHEETS—SHEET 3.
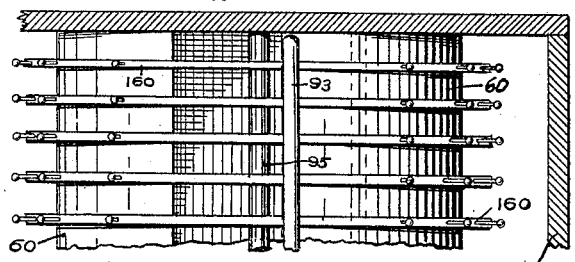
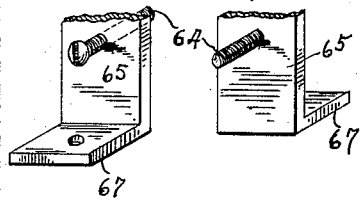
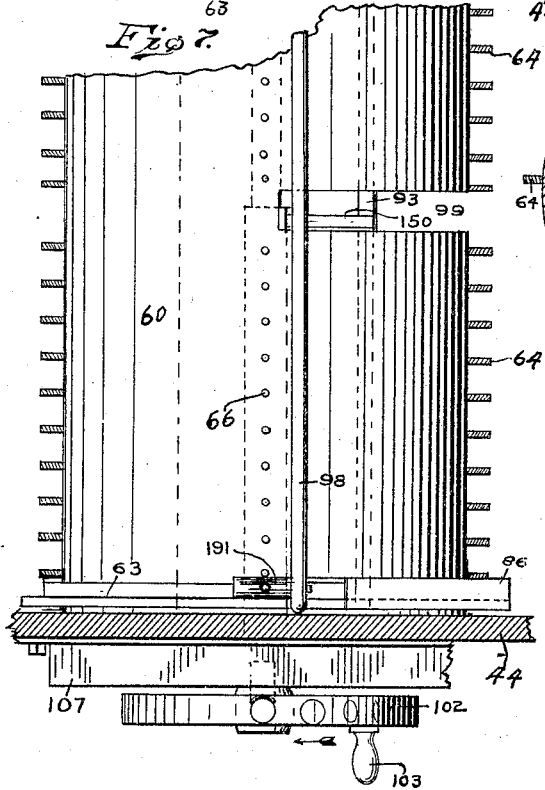
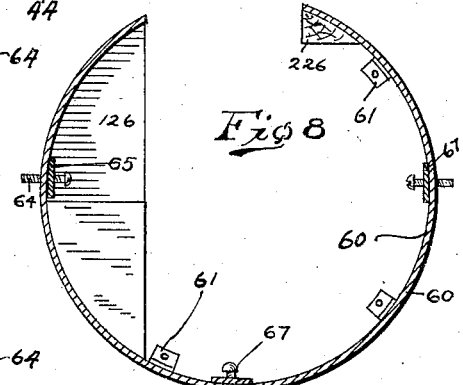
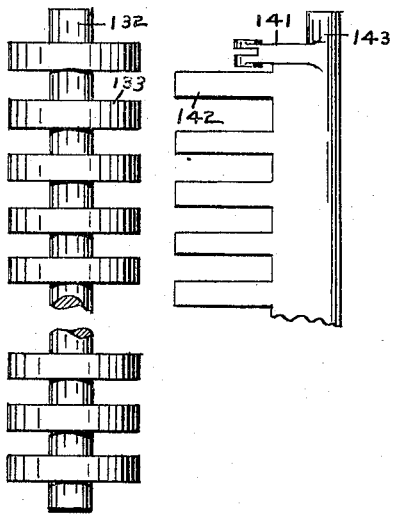
Witnesses
Harry J Pearce
Nellie Allenough
Inventor
John B. Mahana
By V. H. Lockwood
Attorney

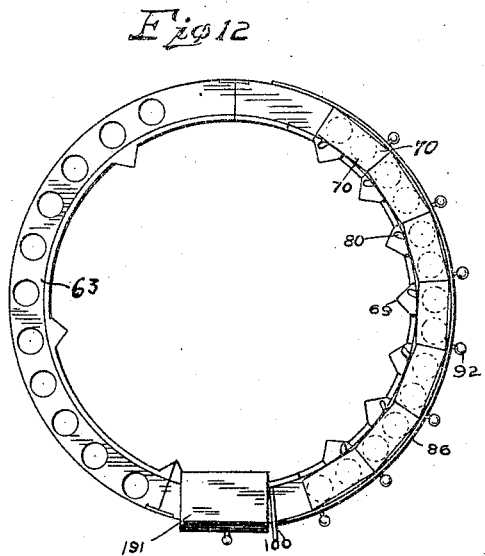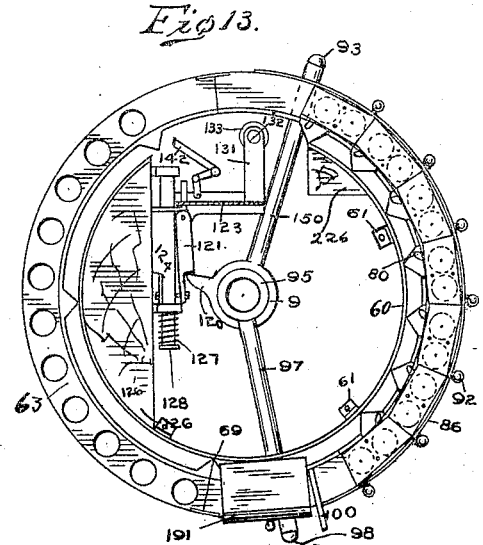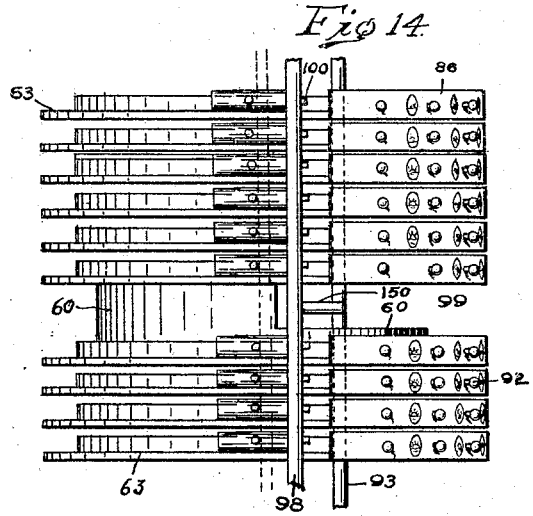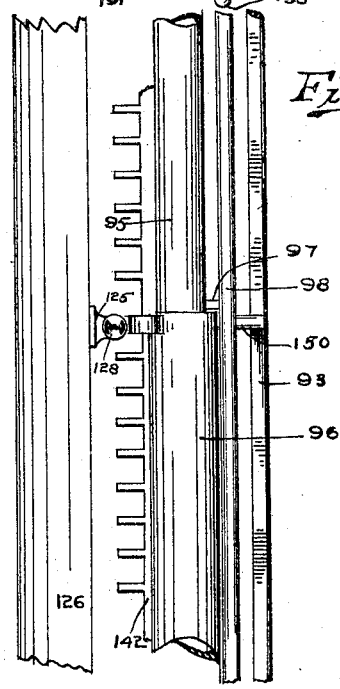

No. 775,112. PATENTED NOV. 15, 1904.
J. B. MAHANA.
VOTING MACHINE.
APPLICATION FILED MAY 25, 1903.
NO MODEL. 9 SHEETS—SHEET 5.
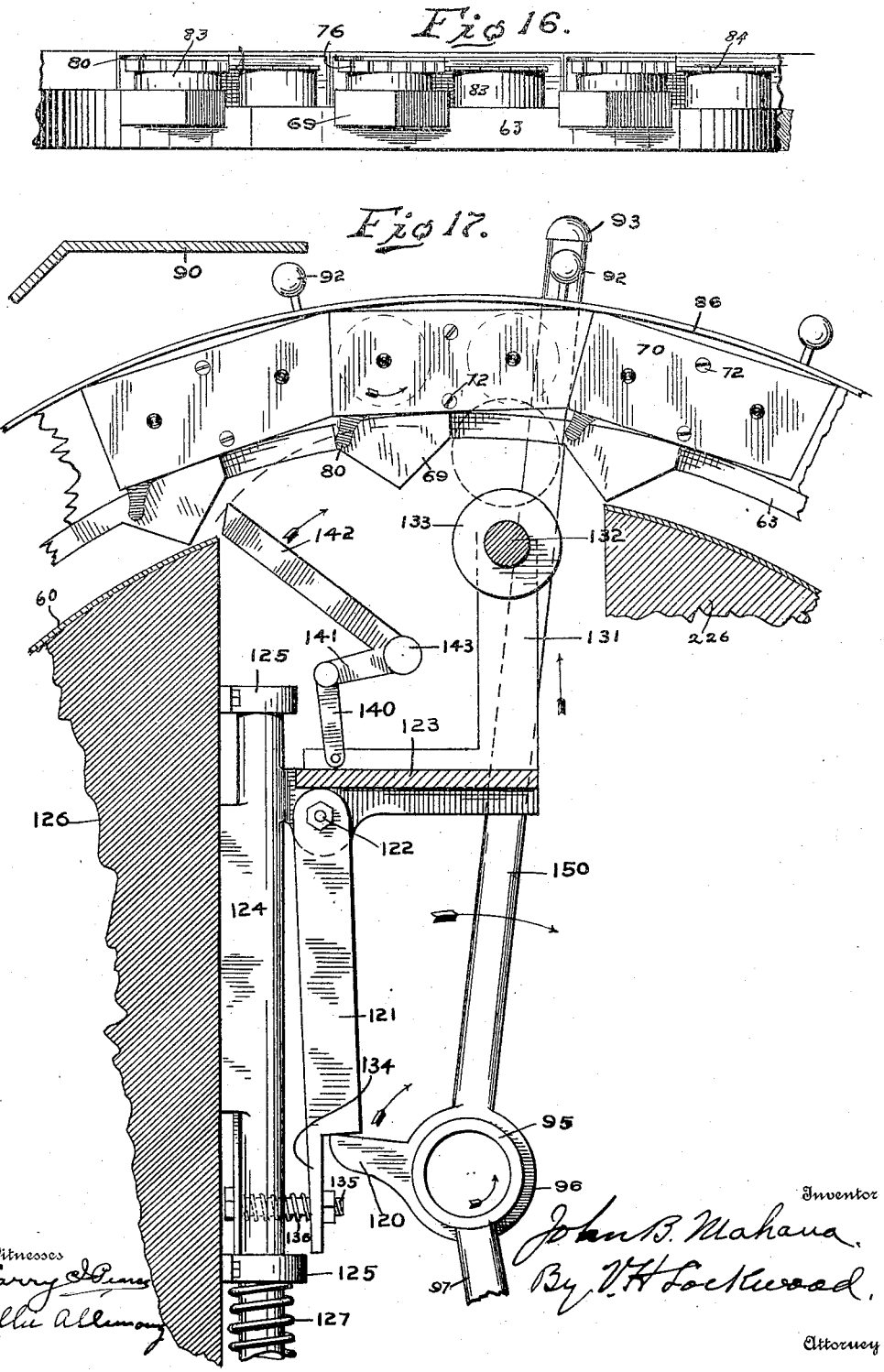

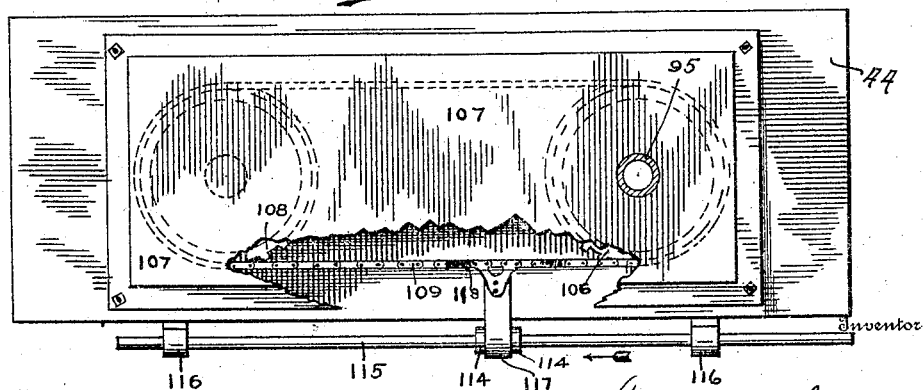

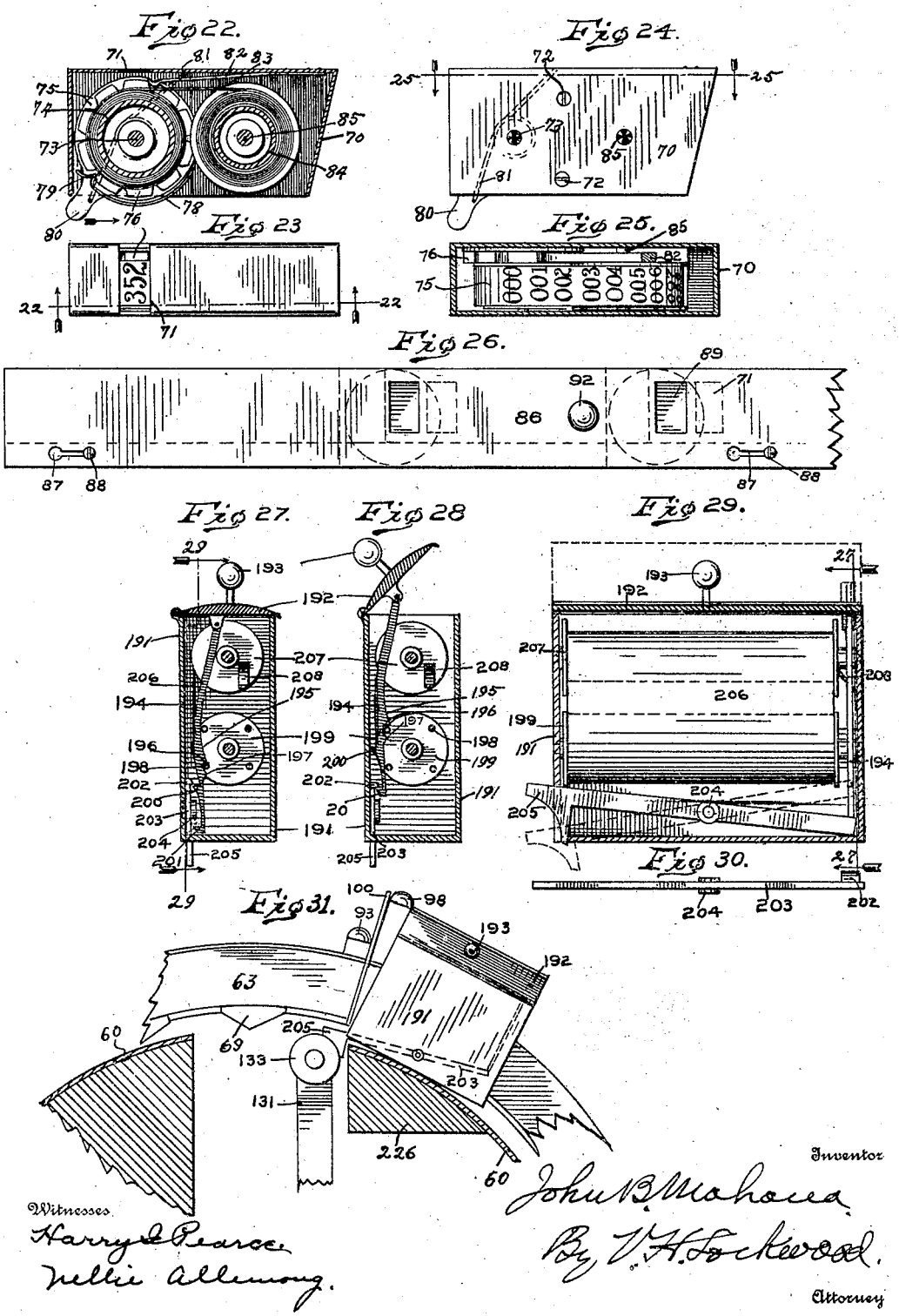

No. 775,112. PATENTED NOV. 15, 1904.
J. B. MAHANA.
VOTING MACHINE.
APPLICATION FILED MAY 25, 1903.
NO MODEL. 9 SHEETS—SHEET 8.
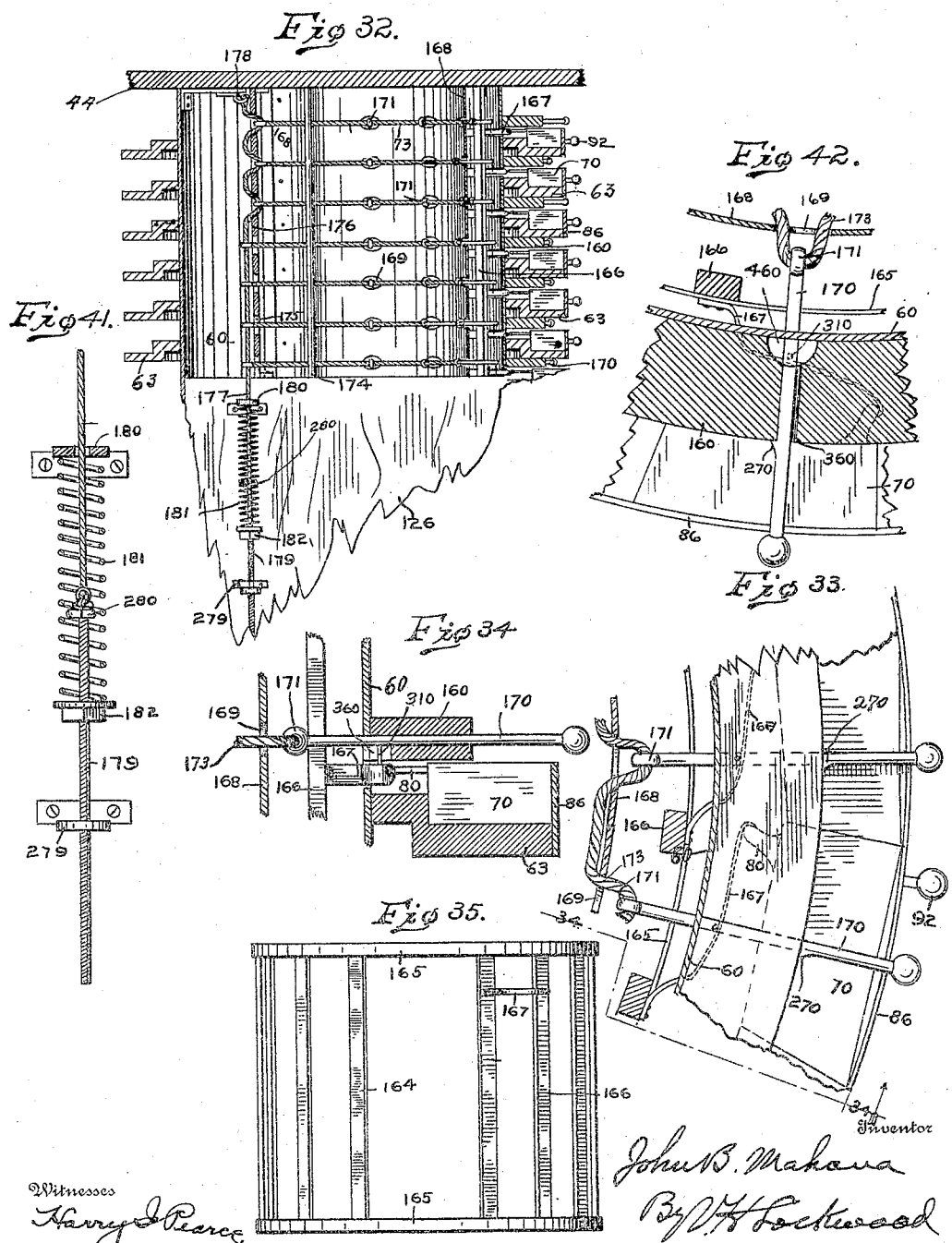

No. 775,112. PATENTED NOV. 15, 1904.
J. B. MAHANA.
VOTING MACHINE.
APPLICATION FILED MAY 25, 1903.
NO MODEL. 9 SHEETS—SHEET 9.
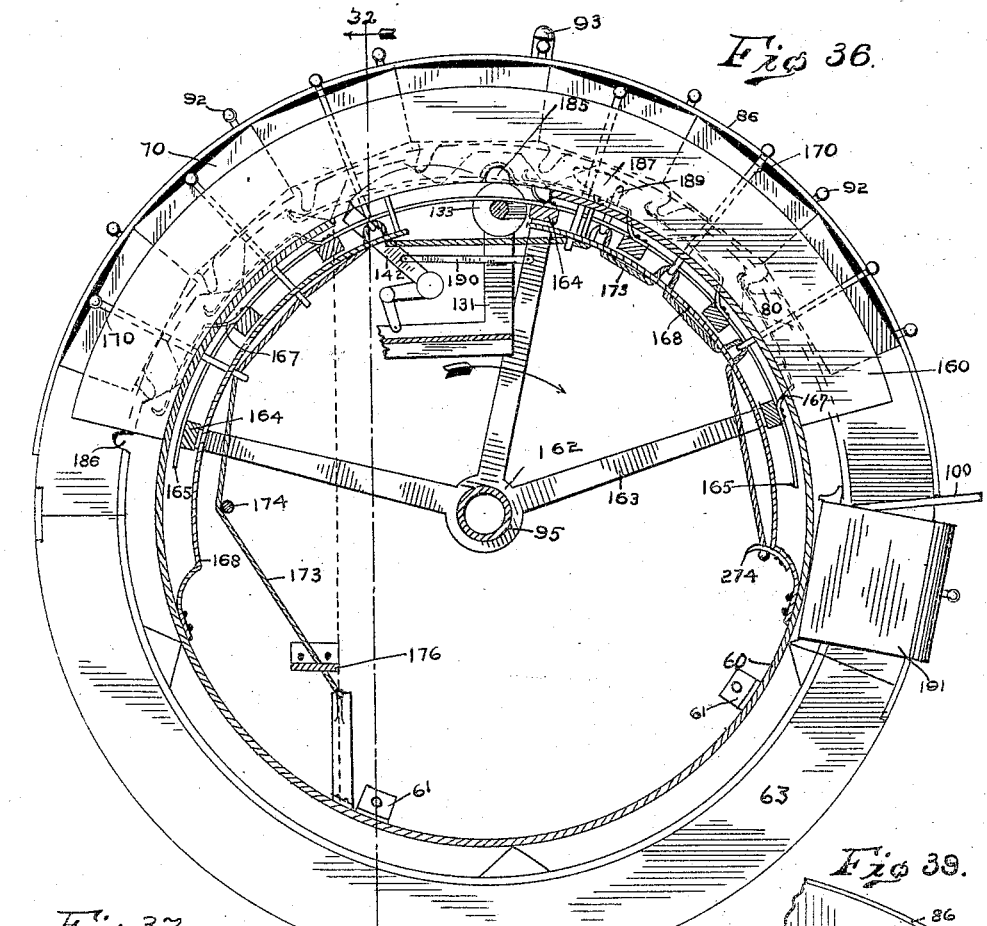
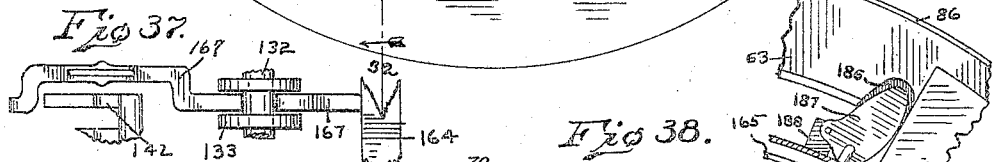
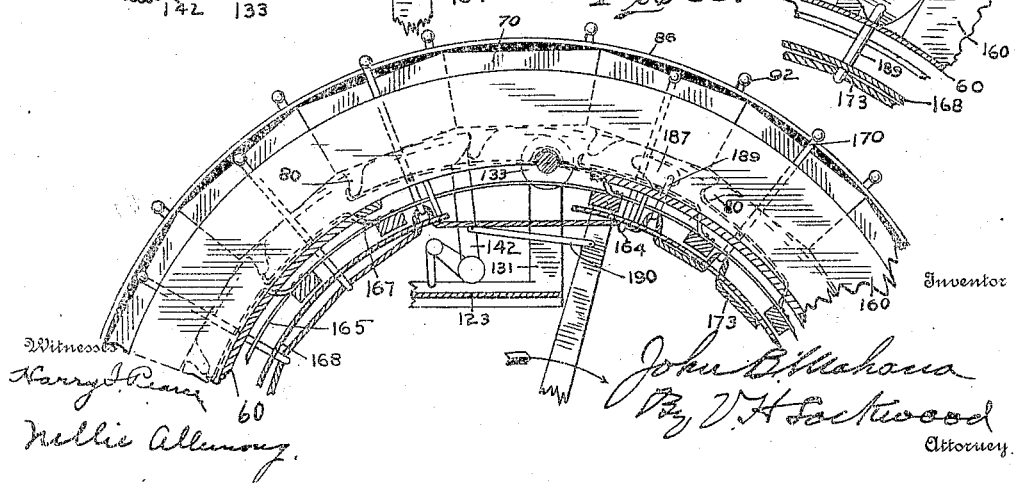

No. 775,112. Patented November 15, 1904.

UNITED STATES PATENT OFFICE.

JOHN B. MAHANA, OF TACOMA, WASHINGTON.

VOTING-MACHINE.

SPECIFICATION forming part of Letters Patent No. 775,112, dated November 15, 1904.

Application filed May 25, 1903. Serial No. 158,745. (No model.)

*To all whom it may concern:*

Be it known that I, JOHN B. MAHANA, of Tacoma, county of Pierce, and State of Washington, have invented a certain new and useful Voting-Machine; and I do hereby declare that the following is a full, clear, and exact description thereof, reference being had to the accompanying drawings, in which like numerals refer to like parts.

The object of this invention is to provide a voting-machine that fulfils the usual requirements of laws relating thereto and enables a person within the usual prescribed time to vote wholly in secret and for any candidate or person he wishes to vote for and which accurately records the vote and at the same time does not enable the voter to vote for more than one candidate for the same office, excepting in the case of group voting. This machine belongs to the class of voting-machines where the registers are moved into position for actuation instead of being stationary and bringing the actuators to them. Hence the usual interlocking mechanism is rendered needless, which greatly simplifies the machine. In this machine the registers for each office are mounted on an annular carrier revoluble by the voter, so as to bring the registering mechanism for any candidate into the voting position. This enables the machine to be built with a comparatively small face. In the machine here shown the face is about thirty by thirty-two inches, and the capacity of the machine is four hundred forty-eight candidates. It also provides a straight-ticket-voting mechanism which enables him to bring by a slight movement the registers for every candidate on any party-ticket into the voting position. This machine also belongs to that class of voting-machines where parts of the machine are set by the voter while he is operating the machine; but the registers are actuated afterward as he leaves the voting-machine. It readily permits him to change his vote before he leaves the machine. One advantage of this machine is that the voting portion of it may be reduced as the election requires, the part not being used being at that time covered, so as to expose only the part that is in use. Furthermore, the part in such instance which is not in use is not operative at such an election. If only five offices are to be voted for, only five register-carriers need be used, the rest being covered or hidden from view and inoperative.

The full nature of this invention will be understood from the accompanying drawings and the following description and claims.

In the drawings, Figure 1 is an elevation of the right-hand end of the case which incloses the voting-machine proper with the pedal-boards folded up to form the front and top of the case. Fig. 2 is an elevation of the right-hand end of the entire device arranged for voting, the voting-machine proper, together with its frame, being elevated out of the case and placed in position for voting, the pedal mechanism being turned down into place for using and means secured at the top for the attachment of curtains. Fig. 3 is a front elevation of what is shown in Fig. 2 with the curtain-bars and also the pedal mechanism removed, the connection with the pedal mechanism being in section. Fig. 4 is a section on the line 4 4 of Fig. 2. Fig. 5 is a front elevation of the voting-machine proper in condition for voting, the same being centrally broken away. Fig. 6 is the same as the upper right-hand corner of Fig. 5 with the register-carriers removed and the casing being shown in section on the line 6 6 of Fig. 2. Fig. 7 is a rear view or elevation of the lower part of a drum in the right-hand side of the machine as shown in Figs. 3 and 4, being a rear view of the lower part of the same drum shown in Fig. 6 with the lower end of the casing in transverse section and showing a rear view of the straight-voting-actuating mechanism. Fig. 8 is a transverse section of the drum, the gap or slot being at the front side of the drum. Fig. 9 shows details of the end of one of the bars extending lengthwise of the drum and within the same and the pins therein for making guideways for the register-carriers. Fig. 10 is a plan view of the evener that puts the register-carriers in the exact position for operation, said evener being centrally broken away. Fig. 11 is a plan view of the register-actuator, the same being broken away. Fig. 12 is a side elevation of one of the register-carriers, showing a number of registers therein. Fig. 13 is an elevation of one end of a drum with a register-carrier thereon and the other parts that are mounted in connection with the drum. Fig. 14 is an elevation of the central portion of one of the drums with the recess in the right-hand portion thereof and showing the register-carriers. Fig. 15 is a rear elevation of the central portion of the parts mounted within the drum, the drum being removed and the ends of the parts being broken away. Fig. 16 is an inside view looking outward of one of the register-carriers at a point where the carriers are located, parts being broken away. Fig. 17 is a transverse section through a portion of one of the drums and the parts therein and thereon, some of said parts being in elevation and the same showing parts that appear in Fig. 13 on an enlarged scale, some of said parts being broken away and a part of the cover being shown in section. Fig. 18 is an elevation of the means for locating the register-carriers exactly and the yoke-shaped frame on which it is mounted. Fig. 19 is a perspective view of what is shown in Fig. 18 looking at it from the right-hand side of Fig. 17. Fig. 20 is a section on the line 20 20 of Fig. 2 with the straight-ticket wheel removed and with parts broken away. Fig. 21 is a bottom view of the voting-machine proper with the straight-ticket wheel removed and the shaft in transverse section and parts broken away. Fig. 22 is a horizontal section of the registering mechanism on the line 22 22 of Fig. 23 and showing the wheels in side elevation. Fig. 23 is a front elevation of the registering mechanism. Fig. 24 is a bottom view of the same. Fig. 25 is a vertical section of the same on a line near the front side so as to remove the front side of the casing. Fig. 26 is a front elevation of a register-carrier, showing the plate covering the series of registers on each carrier, one end being broken away. Fig. 27 is a transverse section of the independent register on the line 27 27 of Fig. 29, showing the lid thereof closed. Fig. 28 is the same, showing the lid open. Fig. 29 is a longitudinal section on the line 29 29 of Fig. 27. Fig. 30 is a front elevation of a catch-lever in the independent-voting register. Fig. 31 is a transverse section of the front portion of a drum and a portion of the parts mounted therein and showing a portion of a carrier in side elevation with the independent-register in voting position, parts being broken away. Fig. 32 is a longitudinal section of the upper part of the drum having the group mechanism mounted on it on the line 32 32 of Fig. 36, the lower part of the drum being broken away. Fig. 33 is a side elevation of one of the carriers containing the group mechanism and the parts coöperating therewith, parts being broken away and parts in section. Fig. 34 is a section of the same on the line 34 34 of Fig. 33. Fig. 35 is a front elevation of the rocking frame in the group mechanism. Fig. 36 is a transverse section of the drum and group mechanism with the parts partially operated, parts being broken away. Fig. 37 is a detail giving the front elevation of one of the springs that spans the slot in the drum in the group mechanism and the associate parts, parts being broken away. Fig. 38 is the same as the upper part of Fig. 1 with the parts further operated, parts being broken away. Fig. 39 is a detail showing the means in the group mechanism for taking up the slack in the cable when any register-carrier therein is initially moved. Fig. 40 is a section on the line 40 40 of Fig. 20, the sprocket-chains being omitted. Fig. 41 is a vertical section of the means for limiting the group-voting on an enlarged scale. Fig. 42 is a horizontal transverse section of a portion of the group-voting mechanism.

In detail the construction of the machine herein shown to illustrate the nature of my invention will be understood from the following description and claims.

In the first place a case or box is constructed, with the sides 35 and the back 36 and the bottom 37 rigidly secured together, as appears best in Fig. 3. The top is closed primarily by a lid 38, connected with the back by the hinges 39, as shown in Fig. 2, so that said lid 38 may be folded forward down within the top of the box to a horizontal position. To let it fit down in the top of the box, as described, the back is a little shorter than the sides, so as to leave a recess at the top to receive said lid when closed. The front of the box is closed by the pedal-boards, as in Fig. 1 and which will be described hereinafter. On the two sides 35 there are strips or bars 40, secured vertically on the inner surface to form vertical guideways for the bars 41 of the vertically-movable frame, which appears in Fig. 2. Said frame consists of the four uprights 41, there being two of said uprights at each side braced at the lower ends by the cross-bars 42 and also braced across each end about midway by the bearing-frame bars 43. The ends of said frame 43 are secured to the inner sides of the uprights 41, so as to miss the guide-bars 40 when the entire framework is pushed down in the box. The upper ends of the uprights 41 have mounted on them on each side a bar 45, so as to be removable, and the forward end of said bar is turned up and across to support the curtain-pole 46.

The voting mechanism is contained in the casing 44, which has secured to each side a trunnion 47, that has bearing in the bearing-frame 43, so that said casing 44 may be oscillated from a vertical position to an oblique position, as shown in Fig. 2. The machine is in the voting position in said figure, the vertically-movable frame and the voting-machine casing 44 having been elevated out of the box first described and secured in the voting position. After the voting is over the casing 44 is turned back to a vertical position and it and the frame on which it is mounted pushed down into the box, the lid 38 closed, and then the pedal-boards turned up into place, as shown in Fig. 1. The whole thing can then be transported by the handles 48. In replacing the casing 44 in the box the bars 45 at the top of the frame in which the casing is mounted are removed, and when the parts are put in the voting position said bars 45 are replaced and the curtains put in place. The voting-machine casing 44 and the frame on which it is mounted are held in the elevated position by the bolts 49, extending through the lid 38 and the rear uprights 41.

The front of the case or box consists of a board 50, which is hinged to the forward edge of the bottom 37 at 51, so that said board can be turned upward. To said board 50 I hinge another board 52, these two boards being preferably wide enough to extend to the top of the case, and to said board 52 I hinge a third board 53, that can turn inward across the top of the case when said pedal-boards are folded in against the case. In this way the box containing the voting-machine is entirely closed, and means 54 are used for locking or otherwise securing said pedal-boards in place when thus closed. When the machine is being set up for use at an election place, said pedal-boards are released and turned down from the position shown in Fig. 1 to the position shown in Fig. 2 and are used to operate the machine as the voter walks upon them in leaving the machine after voting. To accomplish this result, the middle board 52 is provided, near the middle thereof, with a fulcrum 55, adapted to rest upon the floor of the room in which the voting-machine is set up. To this board 52 along one end, preferably the right-hand end, an arm 56, which here is made of angle-iron, is secured. The inner end of said arm 56 does not extend appreciably beyond the inner edge of the board 50 and at its inner end is pivotally connected with means for actuating the voting-machine. The operation of this pedal mechanism is as follows: Before the voter approaches the machine the pedal-boards are in the position shown in full lines in Fig. 2, the inner board 50 being flat on the floor, the middle board 52 being tilted, with its inner edge down and its outer edge and the board 53 being tilted up. When the voter steps on the board 53, he tilts the board 52 the other way, so its outer edge rests upon the floor and its inner edge is elevated, and likewise the inner end of the arm 56 is elevated. As the voter farther approaches he steps upon the inner half of the board 52 or upon the board 50, the arm 56 is depressed, and the parts put in the position shown in full lines in Fig. 2. While he is voting he stands upon the inner half of the board 52 or upon the board 50. After arranging his vote and when he leaves the machine he will step upon the outer half of the board 52 and upon the board 53, which will change the pedal-boards to the dotted line position and elevate the arm 56, so the connecting mechanism will actuate the registering apparatus of the machine and record the vote and reset at that time all the registers actuated, so that when the voter leaves the machine all evidence of how he operated the machine or how he voted will be obliterated, and the next voter cannot discover the character of the preceding vote. The movement of the pedal-boards during the approach of any subsequent voter, whereby the arm 56 is moved downward, does not affect any of the voting mechanism, all actuation of the mechanism being done by the upward movement of the arm 56.

The main case or box in which the machine is mounted and the idea of moving the machine up and down in such casing from the position of non-use to the position of use, as well as the pedal mechanism, may be used in connection with almost any style of voting-machines.

When the voter approaches the machine for voting, it will be in the position shown in Fig. 3, except the pedal mechanism is there omitted and the face of the voting-machine proper will appear substantially the same as that shown in Fig. 5. A machine in two sections is here shown, the two sections being at the left and right hand ends, respectively, of Fig. 5 and consisting each of a cylindrical structure mounted vertically within the casing 44, the front of said casing being open, so that the parts of the machine may be accessible for operation. The two sections of the machine are in general alike and differ only in the fact that the right-hand section is provided at the upper end with a group-voting mechanism which differs from the individual or straight ticket voting mechanism elsewhere shown.

Each section of the voting mechanism referred to consists of a stationary drum or cylinder 60, extending from the bottom to the top of the casing 44. The form in cross-section of said cylinder appears in Fig. 8. It is preferably made of sheet metal, with an opening or slot in the front—that is, on the side facing the voter—extending longitudinally for the full length of the drum. Said drums are secured to the top and bottom of the casing 44 by screws extending through angle-irons 61, which appear in Fig. 8. On and around the drums there are mounted a series of independent annular or ring-shaped register-carriers 63. (Shown in Fig. 12.) Said register carriers or rings are loosely mounted on the drum, so as to revolve, and for this purpose the drum is provided with a series of pins 64, to be seen in Figs. 7 and 8, as guides for said carriers or rings and between which they are mounted. The pins 64 are preferably threaded merely for convenience in mounting, inasmuch as they screw through holes in the bars 65, that are secured within the drum, as shown in Fig. 8. The pins 64 extend loosely through the holes 66 in the drum, as seen in Fig. 7. The bars 65 are turned down at each end to form the angle-plate 67, and that is secured to the top and bottom of the casing 44. Any other means for forming the guideways for the rotary movement of the register-carriers may be adopted.

This machine belongs to that type of voting-machines where the registers are moved by the voter into position for actuation and the registers properly located are actuated by the machine as the voter leaves the machine. The register carriers or rings 63 are formed of metal, preferably in two semicircular sections, so as to be readily placed on a drum and the sections secured at their junction for being placed thereon, as appears in Fig. 12. The carrier consists of a band or horizontal portion, as appears in Fig. 14, and a radially-extending portion integral with the horizontal portion. The horizontal portion is about one-half inch wide, and the radially-extending portion is about one and one-fourth inches wide. From the horizontal rim portion there are a series of inwardly-extending lugs 69, to be seen in Figs. 12 and 13, that are integral also with said rim portion, as appears in Fig. 34. These points or lugs 69 rest upon the drum, being bearing-points, as is shown clearly in Fig. 13. They also are beveled, so as to coöperate with means, hereinafter explained, for locating the register-carrier exactly right for the proper operation of the register.

On the carrier-ring just described I secure a number of registering mechanisms, one for each candidate. There is a register carrier or ring for each office. The registers for all the candidates for any one office are put on the same ring or carrier. In this machine, as appears in Fig. 12, there are seven registering mechanisms besides the independent one, so the machine is arranged for seven tickets besides the independent voting, and, as appears in Fig. 3, there are fifty-six rings, which adapts the machine for voting for fifty-six candidates on each party-ticket.

The registering mechanisms, which are secured to the carriers or rings 63, as appears in Figs. 12 and 13, are illustrated in Figs. 22 to 25. There a register-casing 70 is shown made out of sheet metal, closed on all but the inner side and with the outer side provided with an opening 71, through which the indicating-numerals are disclosed at the proper time. Said casings 70 are secured to the radial flanged portions of the carrier or ring by the screws 72. (Seen in Fig. 24.) Within this casing there is a stationary spindle 73, on which a drum 74 is loosely mounted to rotate. This drum has on its side projections 76, which are somewhat separated to provide notches between them. The actuator-wheel 77 is likewise loosely mounted on said spindle 73 beside the wheel 75 and has the spring 78 secured on its periphery, with the free end bent to form a catch 79, adapted to drop into the notches between the projections 76 on the other wheel. The actuator-wheel 77 has an actuating-arm 80 extending down from it. When said arm 80 is engaged and moved in the direction indicated by the arrow in Fig. 22, the spring 78 will cause the wheel 75 to rotate one notch, the actuating means, hereinafter described, being capable of moving it no farther. After said actuating-wheel 77 has been thus operated it is returned to its normal position, as shown in Fig. 22, by the spring 81, (shown in Fig. 22,) that is fastened at its lower end to the arm 80 and is coiled about the hub of the drum 74, and its free end engages the front side of the casing or the top, as shown in Fig. 22. As said spring returns the wheel 77 to its normal position the spring-pawl 82 prevents the drum-wheel 75 from moving with it. That spring-pawl prevents the backward movement of said drum and consists of a flat spring fastened to the casing at one end and the other end formed into a catch to engage the notches between the projections 76.

The forward rotary movement of the drum 74 conveys a tape 83, that is wound from a drum 84 on a spindle 85 upon the drum 74. Said tape has printed on it numerals beginning with "000" and running upward, (see Fig. 25,) and these numerals are disclosed through the opening 71, as shown in Fig. 23. This construction of a register permits the numerals to be made large. This makes a very simple registering mechanism that operates positively and accurately and cannot operate inaccurately. In order that the numbers on the tape may always come properly under the opening 71 in the casing, as the roll on the drum 74 increases said numerals must be properly located on the tape in printing the numerals on the tape, so that the space between the numbers on the tape will increase as the roll increases.

When the registering mechanism, as has been described, is placed on the carriers or lugs, the plate 86 (shown in Fig. 26) is placed over them, as shown also on the right-hand side of Figs. 12 and 13 and better in Fig. 17. It is provided with a series of slots 87, that extend longitudinally and are enlarged at one end, so as to slip over a headed screw 88, that is secured in the radial portion of the register carrier or ring. Consequently said plate 86 can be radially slipped into place or removed. Said plate 86 has a series of openings 89, that when the plate is in one position correspond with the openings 71 in the casings of the individual registering mechanisms, so as to disclose the numerals therethrough after the close of the election and after the election officers have moved said plate 86 into the position just described. At other times and during the election said plate is in the position shown in Fig. 6, whereas said openings 89 and 71 do not register, and therefore the numerals on the registers are hidden from view.

Having now described the registering mechanism and the carrier for the same and explained that said carriers are mounted rotatably on drums, as appears in Fig. 5, the operation of the same by the voter may be explained. As seen in Fig. 5, there is a stationary cover-plate 90 in front of the left-hand portion of each section, and on it the names of the offices are placed. The right-hand edge of this plate 90 is escalloped, so as to be provided with a number of semicircular notches that register with a circle 91, containing the party emblem, so as to indicate to the voter how far to turn any register-carrier to bring the registering mechanism for the particular candidate for whom he wishes to vote into position for actuation. On the plate 86 (shown in Fig. 17) a paper ballot 286 is secured containing the party emblems, together with the names of the candidates, in a series running from left to right, as is shown in Fig. 5. There are also a number of knobs 92, which the voter catches with his fingers for the purpose of rotating and moving the register-carrier into position to enable him to vote for the candidate he wishes to vote for. As shown in Fig. 5, all of the register-carriers are in position to vote for the Republican candidates. If the voter desires to vote for a Democratic candidate, he will revolve the carrier containing the name of that candidate so as to bring the party emblem into position to register with the semicircular notch in the edge of the plate 91. This can be done with any candidate for any office on any ticket in the manner described if a mixed ticket is voted. When the voter desires to vote a straight party-ticket, he can do so by revolving all of said register-carriers simultaneously by means hereinafter described.

The voter is assisted in the matter of revolving the register-carriers the proper distance by the bar 93, which is stationary while he is operating the machine. By placing the thumb of the right hand on the left side of said bar 93, with the fingers reaching out to the first knob to the right, he can draw that knob up to position immediately under the bar 93 and repeat that operation, if necessary, until the proper party emblem is brought to the voting-place, as shown in Fig. 5. When the register-carriers are in the position shown in Fig. 5, the knobs for the Republican candidates are immediately under the bar 93 and the knobs of the Democratic candidates are in the row at the right of the bar 93. If the Democratic ticket were in position to be voted, the Republican knobs would be immediately under the right-hand edge of the plate 91, as appears in Fig. 17, and then the Democratic knobs would be under the bar 93.

The straight-ticket-voting mechanism will now be described. As seen in several of the figures, there is a central shaft 95 extending longitudinally through each of the two drums. Said shafts 95 are mounted in any suitable bearing in the top of the casing 44 and in the tubular shaft 96 at the lower end, said latter shaft having bearing in the bottom of the casing, as is seen in Fig. 20. About midway of the shaft 95 there is a radially-extending arm 97 secured, which extends outward beyond the surface of the drum and register-carriers and has secured to it the longitudinally-extending bar 98, which may be called the "straight-ticket" bar. The arm 97 operates through the space or slot 99 in the right-hand half of each of the drums and located about midway, as is seen in Figs. 7 and 12 and some of the other figures, so that said arm may be oscillated nearly one-half a revolution, and this carrier or bar 98, which is to be seen in Fig. 13 to the right near the shaft 95, is actuated. As it moves to the right by reason of its engagement with a pin 100 on each register-carrier the bar will revolve all the register-carriers on a drum to any desired point, so that all of them by this one movement and means will be put in place for voting a straight ticket. Said shaft 95 and the straight-ticket bar 98 are revolved for this purpose by the straight-ticket-voting wheel 102, which is rotatably mounted on the under side of the bottom of the casing, as is to be seen in Figs. 2, 3, 5, and 7. It has on it a handle 103 for its operation, and it is mounted rigidly on the shaft 95, so that the movement of said wheel 102 will rotate the parts referred to. To indicate how far to revolve said straight-ticket wheel 102 to vote the desired ticket, party emblems are placed on the periphery thereof, as seen in Fig. 5. The circle to the left, 104, is a blank which registers with the circular edge of the guide-lug 105 when the machine is reset and before it is operated by the voter. If the wheel 102 is revolved so as to bring the Republican emblem opposite the guide-lug 105, as is shown in Fig. 5, the bar 98, to be seen in Fig. 13, through its engagement with the pins 100 will revolve all the register-carriers in the entire machine to the position shown in Fig. 5, so that every register for the Republican candidate will be in position to be actuated, and the subsequent actuation of the same will vote the straight Republican ticket. If some other straight ticket is desired to be voted, the wheel 102 is turned correspondingly farther, so that all the voter has to do in order to vote a straight ticket is to turn that wheel 102 the few notches necessary to bring his party emblem into voting position, and then all the register-carriers will be brought to the voting position. In order that this one straight-ticket wheel 102 may actuate the register-carriers on both drums, I secure a sprocket-wheel 106 within the casing 107 on the shaft 95 at the right, and another sprocket-wheel, 108, on the shaft 95 at the left and connect them by the sprocket-chain 109. (Shown in Fig. 21.) This arrangement causes a similar and simultaneous operation of all straight-ticket-voting mechanisms in the machine.

After a voter has in the manner heretofore described placed the various register-carriers in the proper position to vote for the candidates he wishes to vote for the registers for these candidates will be operated by the following mechanism as the voter leaves the voting-machine: Referring to Figs. 2 and 3, as the voter walks off the pedal-boards and steps on the outer half of the board 52 or upon the board 53 he will throw the arm 56 upward. This arm is pivoted to the link 110, that in turn is pivoted to the bell-crank 111, fulcrumed at 112 on the post 113, secured to the bottom of the main case. Therefore the upward movement of the arm 56 will throw the upper arm of the bell-crank 111 to the left from the position shown in Fig. 3, and such movement of the upper arm of the bell-crank, because it is connected with the arm 114, (shown in dotted lines in Fig. 2,) will cause that arm to move to the left, and that arm 114 is secured to the rod 115, to be seen in Fig. 21, at the bottom and rear of the casing 44 and extending inward, as indicated in dotted lines in Fig. 2. The rod 115 is slidably mounted in two bearings 116, secured to the lower rear portion of the casing 44. The arm 114 is divided at the point where it is secured to the arm 115, as seen in Fig. 21, and another arm 117 is secured to said rod 115 and extends forward and is secured to the inner sprocket-chain 118, corresponding to the sprocket-chain 109, and mounted on sprocket-wheels 306, similar to the sprocket-wheels 106 and 108, that are, however, secured to the tubular shafts 96, there being one of said shafts at the right and one at the left, as seen in Fig. 20. There is one of these tubular shafts 96 for each drum, and it has bearings in the bottom of the casing, as seen in Fig. 20, and extends upward around the shaft 95 to a point about midway of the drum, as seen in Fig. 15.

The two shafts 95 and 96 operate independently of each other and in opposite directions while they are performing the function for which they are made. At the inner end of the shaft 96, as shown in Figs. 15 and 17, there is a finger 120, shown integral with said shaft, which normally engages a shoulder at the lower end of the bar 121. This bar 21 is at 122 pivoted to the center of the yoke-frame 123, as said yoke extends for the full length of the drum, as seen in Fig. 18. Therefore the frame 121 when actuated moves said yoke upward, as in Fig. 17, or forward in the machine as used. This yoke-frame 123 is integral with a sliding bar 124, to be seen in Fig. 17, which is slidable in two bearings 125, that are secured to a wooden block 126, rigid in the drum at the left-hand side. This wooden block and also another block, 226, extend for the full length of the left drum and up to the group mechanism in the right drum and are secured to the sheet metal of the drum for about one-third of the way around, so as to reinforce it and furnish means for mounting the mechanism now being described. The bar 124 is drawn rearward by the spring 127, which at one end bears against the bearing 125, as seen in Fig. 17, and at the other end bears against the head 128 on the end of the bar 124. (See Fig. 13.) The yoke-frame 123 also has a pair of L-shaped pins 130 extending loosely through it near each end, that are secured rigidly in the wooden block 126, as seen in Figs. 13 and 19. These pins 130 are merely to assist the bearings 125 in guiding the reciprocatory movement of the yoke-frame 123. Said frame 123 has on it three arms 131, as seen in Fig. 18, that extend forward in the machine when set up or upward when viewed as in Fig. 17, in which the shaft 132 is journaled. Said shaft, as seen in Fig. 10, has a number of disks used for exactly locating the register-carriers. There is one disk 133 for each register-carrier in the machine.

When the voter leaves the voting-machine, the mechanism heretofore described causes the oscillation of the tubular shaft 96 in the direction indicated by the arrow in Fig. 17, so that the finger 120 thereon will, through the bar 121, force the yoke-frame 123 and all of the parts connected therewith upward, as shown in Fig. 17, or forward in the machine while in use, and such movement of said yoke-frame will cause the disks 133 to engage the inclined sides of the lugs 69 on the inside of each register-carrier, and thereby cause the register-carrier to assume the exact position necessary for the operation of its register. This appears from the dotted-line position of the disks 133 in Fig. 17, and then the arm 80 on the counting mechanism at the left of the disk 133 in Fig. 17 is in the exact position to be actuated for the operation of the counter with which it is connected. To have the bar 121 and the finger 120 properly operate, there is an extension 134 therefrom, through which a bolt 135 extends, that is secured to the bar 134, and the spring 136 fits between them, so as to keep the bar 121 forced inward toward the finger 120. By means of a nut on the bolt 135 the bar 121 can be adjusted so as to escape from the finger 120 at the right time to give the proper movement to the frame 123. As the yoke-frame 123 moves forward in the machine or upward, as appears in Fig. 17, it forces upward the connecting-bars 140, pivoted to said yoke 123 near its middle and near each end, and since said bars 140 are pivotally connected to the bottom 141 of the actuator 142 like a bell-crank and said actuator is fulcrumed at 143 in the top and in the bottom of the casing 44 the fingers of the actuator will be turned in the direction indicated by the arrow in Fig. 17, and since there is one finger on said actuator for each arm 80 connected with the registers in the row that is in position all the arms 80 will be turned and the register mechanism, as heretofore described, will record the additional vote for each office.

The throw of the fingers of the actuator 142 is limited, so as to move the arm 80 on the register just about the proper distance by the arrangement heretofore described with reference to the parts 120 and 121, as the further inward the bar 121 is adjusted the higher the yoke 123 will be moved and the further the fingers on the actuator will be turned, and vice versa. As soon as the fingers on the actuator have reached the desired limit of movement the shoulder on the bar 121 will escape from the finger 120 on the shaft 96 and the actuator-fingers will not be moved further, and as the shoulder on the bar 121 escapes from the finger 120 the spring 127 draws the yoke back to its normal position and also the actuator. Then the vote of the voter has been fully recorded.

The resetting mechanism will now be explained. It is operated as the voter leaves the machine and is a continuation of the actuation of some of the parts just described to bring about the registration of the vote, for after the bar 121 has escaped from the finger 120 on the shaft 96 said shaft 96 continues to revolve further in the direction of the arrows shown in Fig. 17 and carries the arm 150 to the right, and since on that arm the bar 93 outside the drum and extending longitudinally thereof is secured said rod 93 will be swept to the right from the position shown in Figs. 13 and 17 and will engage the pins 100, extending out from each of the register-carriers, and move all of said pins around to the position shown in Fig. 13, where it is stopped by the pins coming in contact with the bar 98, and that bar is reset, too. The backward sweep of the rod 93 not only carries the pins 100 back, but also carries the rod 98 back to its normal position until the latter is stopped by its arm 97 reaching the end of the slot 99, located in the middle of the drum, as heretofore described. The parts remain in this position until a subsequent voter walks upon the pedal-boards, and then the downward movement of the arm 56 (shown in Fig. 2) throws the bell-crank lever 111 in the opposite direction or to the right into the position shown in Fig. 3, and that movement returns the chain 118 to its former position, and it causes the rotation of the tubular shaft 96 back in the direction opposite to the arrows in Fig. 17 to the position shown there, and the return movement of that shaft causes the bar 93 to be moved from the downmost position at which it is left when the voter leaves the voting-machine to the position shown in Fig. 17, where it is stopped by reaching the upper end of the slot 99. As the shaft 96 makes this return movement the finger 120 engages the lower part of the bar 121, and since said finger is rounded on the rear side it pushes the lower end of the bar 121 out of its way against the spring 126, and after the finger 120 passes below the shoulder of the bar 121 the spring pushes the bar back to its normal position, as shown in Fig. 17. The parts are then ready for operation again by the voter.

It is apparent from the description heretofore given and the understanding now had of this machine that ample facilities are provided for the voter to change his vote while he is operating the machine. If he wishes to change his vote for any particular office, he merely moves the register-carrier of that office to the desired changed position. If he had operated the straight-ticket mechanism too far, he would have to return all the registers by hand to the desired position or throw them back to the inoperative position, and then he could operate his straight-ticket wheel. If he should operate the straight-ticket voting mechanism so as to bring the candidates for a certain party into the voting position and wish to change any particular vote, he could do this by merely turning the particular register-carrier to the proper place.

This machine enables the average voter to vote very quickly. If he desires to vote a straight ticket, he merely turns the straight-ticket wheel a slight distance and then leaves the machine. If he wishes to vote for all but one candidate on a ticket, he turns the straight-ticket wheel and brings that ticket into the voting position and then by hand moves the register-carrier for that one candidate into the proper place and he is done. If the voter expects to scratch on a half-dozen offices, the quicker way is to turn the straight ticket into the voting position and then change the half-dozen register-carriers that he wishes to scratch to vote his mixed ticket.

The group-voting mechanism will now be described. It may be located anywhere in the machine; but in the machine herein shown it is at the upper part of the right-hand drum, as appears in Figs. 3, 5, 6, 32, and 36. The drum is left unchanged, excepting the wooden block 126 is omitted in the portion of the drum where the group-voting mechanism is mounted. A pair of semicircular guide bars or ribs 160 are secured on the drum, as appears in Fig. 6, by screws inserted from the inside, as appears in Fig. 36. The number of these ribs is as great as the number of group candidates provided by law to be voted for. These ribs extend across the front half of the drum, and therefore across the longitudinal slot therein, as appears in Fig. 36. The ribs are cut away on the inside to provide notches 185, to be seen in Fig. 36, to permit the upward movement of the rod 132 and disks 133, which move the carriers to bring the registers into the exact position after having been moved by the voter to an approximate position. Above each of said ribs there is mounted on the drum a register-carrier 63. The register-carriers, registers, and knobs are the same in the group-voting part of the machine as has been described for the other parts of the machine. Within the drum at the place where the group mechanism is mounted there is placed a semicircular rocking frame mounted on the shaft 95, which extends through the drum so as to be oscillatory. Said frame consists of a ring 162 at each end to bear loosely upon said shaft 95 and three radial arms 163, on which there are secured cross-bars 164. (See Fig. 35.) Over the ends of the series of cross-bars 164 there is secured a sheet-metal strip 165 at each end of the frame, and cross-bars 166 are secured to the inner surface of said sheet-metal strips 165, as appears in Figs. 35 and 36. On said rocking frame there is a series of flat springs 167, secured at the right-hand end, as appears in Figs. 33, 35, and 36, to the cross-bars 164 and 166. Only one of said springs, however, is shown in Fig. 35. They are therefore practically in a circumferential row, with the left-hand or free ends turned upward and curved to the right, as shown in Fig. 36, and one spring in each row is long enough (see Fig. 37) to span the slot in the drum. Within said rocking frame there is a stationary sheet of metal 168 on each side and secured along each edge of the metal to the inner surface of the drum, as appears best in Fig. 36. These two sheets of metal are separated from each other at the longitudinal slot through the drum. Said sheets of metal extend longitudinally substantially as long as the rocking frame, (shown in Fig. 35,) so that said plates will be inside of said frame and not interfere with the movement of the frame. These sheets 168 are provided with a series of holes or slots 169, which are oblong transversely and through which a number of rods 170 extend radially. Each of said rods also extends through a slot 260 in the drum and slots 360 in the ribs 160, the latter guiding the movement of said rods. The rods have on their outer ends heads or knobs, whereby they may be drawn outward by the voter, and shoulders 270 to hold them in their outer position. The inner ends of the rods are provided with an eye 171, (seen in Fig. 34,) and through the eyes on each transverse series of rods 170 a cable 173 extends, one end of said cable being fastened at 274 to the metal sheet 168 and the other end passing over the rod 174, that extends longitudinally from the top of the casing 44, through the upper end of the drum to the upper end of the wooden block 126, and through longitudinal slots 175 in the bar 176, that is mounted similarly to the rod 174. At the extreme end of the cable 173 there is an eye, through which the longitudinal cable 177 loosely passes, as shown in Fig. 32. Said cable 177 is at 178 secured to the top of the casing 44 and at its lower end passes through a bracket 180 and is secured to a rod 179, passing loosely through a bracket 299, secured in the wooden block 126. The taking up of the cable 177 by the group voting is limited by the head 280 on the rod 179 engaging the bracket 180. Said rod 179 is held downward by a spiral spring 181, acting between the bracket 180 and the nut 182 on said rod, the rod being threaded, whereby the amount of slack which said cable 177 has may be predetermined and fixed in accordance with the number of votes in the whole group which a voter is by law entitled to cast. In the machine shown the group mechanism is arranged for seven. This setting mechanism is regulated by the election officers prior to the election so as to limit the group voting to the legal number. Each of the group-carriers has a notch 186 on its under side, as seen in Fig. 36; but when said carriers are in their normal position it is above and to the right of the center in engagement with the pivoted lock 187 (shown in Fig. 39) in engagement with said notch 186 and in Figs. 36 and 38 after said lock has been actuated. This lock or plate 187 is pivoted at 188 to one side of the ribs 160 close to the drum and operates somewhat like a bell-crank. The upper end extends into the notch 186 normally, and another end or corner is connected by a link 189 with the cable 173, said link extending through the drum. The function of this particular mechanism is that when a register-carrier is moved far enough to bring the first register into voting position the notch 186 will actuate the pivot-block 187 and throw it into the dotted-line position shown in Fig. 3, which will draw up the cable 173 so as to take up one-seventh or the proper fractional amount of the slack of the cable 177. (Shown in Fig. 32.) If he votes a straight ticket and moves all seven carriers, then all the slack of the cable 177 will be taken up. This movement of an individual carrier or all seven carriers will take up only the amount of slack described regardless of what particular candidate on any one carrier he may vote for; but if he wishes to vote for more than one candidate on the same carrier after having operated the straight-ticket mechanism it will be necessary for him to first move back to their normal position the carriers that have been moved up by the straight-ticket mechanism containing candidates for whom he does not wish to vote. If he thus moves back four carriers to zero, he will then return to the cable 177 four-sevenths of the slack. This will permit him then to vote for more than one candidate on such carrier by drawing outward the rod 170 opposite the name of the candidate for whom he wishes to vote. Each withdrawal of a rod 170 will take up one-seventh of the slack, as appears in Fig 36, so that when he has withdrawn enough of such rods 170 as to take up all the slack he has reached the limit of the number of candidates he is entitled to vote for. The voter then does nothing further, but leaves the machine. If he does not operate the straight-ticket mechanism, he can then move the register-carriers independently into position to vote for one candidate on each one he moves, and if he wishes to vote for more than one candidate on any he has moved he must pull the rod 170 for the desired candidate.

The movement of one or more of the carriers to bring certain registers to the voting position will result in voting for the candidates corresponding to such registers. After they are moved in such position and the rods 170 are drawn in such moved carriers the carriers are not to be moved farther. If one wants to vote for all seven candidates on one carrier, he can set it, as shown in Figs. 36 and 38, with the fourth register in voting position and then operate all of the rods 170 for such carrier; but before said rods can all be withdrawn all the other carriers must be at normal.

As the voter leaves the voting-machine the carriers in the voting position are operated by the actuator-bar 142 in the same way as in any other part of the machine, while the other registers adjacent the rods 170, which have been operated, are actuated by the actuator-bar 142 through the connecting-bar 190, the rocking frame, and the springs 167, which have been lifted by the pins 370 by the withdrawing of the rods 170, so that the upturned ends of said springs can when said frame is rocked engage and actuate the arm 80, connected with the various registers. The pin 370 in the rod 170 extends from it through a recess 460 in the rib 160, as seen in Figs. 34 and 42, to engage the springs 167. The springs 167, which have not been lifted so as to move outward, because the voter has not withdrawn the rods 170 for them, will not actuate any register. In this way all the registers in the voting position will be actuated, and also all registers beside the rods 170, which have been withdrawn, will be actuated. As the actuator-bar 142 returns to its unoperated position it through the connecting-bar 190 also returns the rocking frame to its normal position, and that moves the spring 167 backward against the pins 370 on the rods 170, and that dislodges the shoulders 270 from the position in Fig. 42, so the springs 167 and also the spring 181, withdrawing the cables, will return all the actuator-rods 170 to their inner position, and in this way the parts are reset. The rocking frame therefore always operates in either direction with the actuator-bar 142; but the springs 167 thereon never operate or affect anything unless they have been released by the rod 170 having been operated.

Turning now to the independent-vote record, suitable carriers 191 therefor are provided, as shown in Figs. 27 to 31. It consists of a casing with one end closed by a lid 192, hinged on one side, as shown in Figs. 27 and 28, and having a knob 193 thereon for opening the same. An actuator-bar 194 is pivoted at one end to said lid. The shape of the bar 194 is preferably as shown in Figs. 27 and 28, having on one side two inclined shoulders 195 and 197 and a toothed projection 196 to engage one of the pins 198 and the roller 199. Said actuator-bar also has on the other side two catches 200 and 201, adapted to engage the end 202 on the latch-bar 203, that is centrally pivoted at 204 to the casing near the bottom and has on one end a catch 205, adapted to drop over one edge of the drum along one side of the longitudinal slot therein, as appears in Figs. 29 and 31. There are four pins 198 on the roller 199, arranged concentric and equidistant from each other. Said roller carries a sheet of paper 206, that is longitudinally rolled on a roller 207 and is fed from that on the roller 199. A flat spring 208, secured to one end of the casing, bears against the roller 207 to prevent the unrolling of the paper, excepting when the roller 199 is actuated.

The independent-vote-record mechanism 191 is secured on each register-carrier, as shown in Figs. 12 and 13, where the carriers are in their unoperated position, and in Fig. 31 the independent-vote-record mechanism is shown in its voting position. It is placed on the group-carriers the same as on the other carriers. As observed in Figs. 12 and 13, it is secured to the carrier immediately behind the stop-pin 100. If one desires to vote an independent ticket, he moves the carrier from the position shown in Fig. 13 as far as he can until the pin 100 comes into contact with the resetting-bar 91, as shown in Fig. 31. He cannot turn the carrier any farther, and when it gets that far all the independent-vote-record mechanisms have passed beyond the voting position, so none of them can be operated. When it reaches that position, the catch 205 on the catch-lever 203 in the independent-vote-record mechanism extends beyond the edge of the drum along the right-hand side of the slot therein, as seen in Fig. 31. The voter then opens the lid 192, and when he does that the actuator-bar 194, connected therewith, will operate the lever 203 to the dotted-line position in Figs. 29 and 31, and then the catch 205 will extend over the edge of the drum. After the door of the independent-vote-record mechanism is opened it is thus evident that the register-carrier cannot be moved in either direction by the voter, so that he is absolutely prohibited from voting for a regular candidate for the same office. He then writes the name of his independent candidate on the sheet 206 in the register and closes the lid, and as he closes the lid it pushes the actuator-bar 194 downward from the position shown in Fig. 28 to that shown in Fig. 27, and such movement of said bar turns the roller 199 one notch, which moves the sheet of paper 206 on the roller 207, so that a subsequent voter cannot see the name of the independent candidate voted for. The closing of the lid, however, does not affect the position of the bar 203 below, but leaves it in the dotted-line position, so that still the voter cannot move the carrier. As he is leaving the machine the pedal mechanism through the means heretofore described in elevating the disks 132 throw up the catch 205 on the lever 203 and return that lever to its normal position out of engagement with the edge of the drum and the resetting-bar 93 will return the carrier to its normal position. If the voter wishes to vote for an independent candidate for every office, he can use the straight-ticket mechanism for moving all of the independent-vote-record mechanisms to the voting position.

After the voter has written the name of the independent candidate in the independent-vote-record mechanism he cannot open the lid to write the name of another candidate therein, for when he has closed the lid once he has pushed the bar 194 down, so that the second or upper catch 200 passes below the elevated end of the lever 203, which as yet has not been returned to its normal position. If he then undertakes a second time to open the lid, the shoulder 195 by engaging the pin on the wheel 199 will push the bar to the left and cause the catch 200 to move under the elevated end of the bar 203 and stop such opening movement; yet the mechanism is so arranged that when said lid is closed the hook 197, having an inclined inner surface will draw the bar 194 to the right, so as to move the catch 200 out of the path of the elevated end of the lever 203 when said bar is being moved to its normal position through the pedal mechanism and its intermediate connections, heretofore explained. When said bar 203 is in its normal position, the voter has left the machine, and a subsequent voter can readily open the lid, because said bar 203 will not then be in position to engage the catch 200 and prevent the engagement of the bar 194 and the opening of the lid. Therefore it is seen that ample provision is made in this machine for independent voting, and yet the construction is such that the voter cannot vote for any other candidate for the same office, and he can vote for an irregular candidate for one office and for any regular candidate for any other office without difficulty, and he can move all of the independent-vote-record mechanisms into voting position simultaneously by the straight-ticket mechanism, if he desires.

While I have shown herein details of the construction of the novel voting-machine embodying the principles of my invention, I do not wish to be limited to such details, as some of the novel ideas herein may be carried out in different ways, as will occur to the ordinary mechanic skilled in the art.

What I claim as my invention, and desire to secure by Letters Patent, is—

1. In a voting-machine, curved register-carriers, means on which they are mounted so they may be independently movable to bring any register to the voting position, and means for actuating the register when in such position that is subsequently actuated by the voter by leaving the machine.

2. In a voting-machine, a series of curved register-carriers, means on which they are mounted so they may be independently revolved to bring the desired register to a voting position, and means for simultaneously actuating all of the registers in the voting position that is subsequently actuated by the voter by leaving the machine.

3. In a voting-machine, a series of curved register-carriers, means on which they are mounted so they may be independently revolved to bring the desired registers to a voting position, a single means for moving all of them simultaneously so as to bring the registers devoted to a single party-ticket to the voting position, and means for simultaneously actuating all of the registers in the voting position that is subsequently actuated by the voter by leaving the machine.

4. In a voting-machine, a series of curved register-carriers, a single means on which they are mounted side by side so they may be independently revolved to bring the desired registers to a voting position, and means located within the machine behind the register-carrying means for actuating the registers when in such position.

5. In a voting-machine, a casing, a series of curved register-carriers, means secured within said casing on which they are mounted so they may be independently revolved to bring the desired registers to the voting position, and means operative as the voter leaves the machine for actuating the registers when in such position that is subsequently actuated by the voter by leaving the machine.

6. In a voting-machine, a casing, a plurality of series of curved register-carriers, a plurality of means secured within said casing side by side on which said register-carriers are mounted side by side so they may be independently revolved to bring the desired registers to the voting position, and a single means located within the machine behind the register-carrying means for actuating all the registers when in such position.

7. In a voting-machine, a casing, a plurality of series of curved register-carriers, a plurality of means secured within said casing on which said register-carriers are mounted side by side so they may be independently revolved to bring the desired registers to the voting position, a single means for revolving all of the register-carriers in the machine to bring the registers devoted to the candidates on any party-ticket to the voting position, and a single means for actuating all of the registers when in such position that is subsequently actuated by the voter by leaving the machine.

8. In a voting-machine, a curved register-carrier, means on which it is mounted so it may be revolved independently in either direction to bring any desired register to the voting position or to enable a voter to change his vote, and a single subsequently-actuated means for actuating the register that is left in the voting position.

9. In a voting-machine, a casing, curved register-carriers, means on which the same are mounted so as to be revoluble to bring the desired registers to the voting position, tickets secured on said register-carriers with a circle inclosing the party emblems, and a stationary plate secured to the casing immediately in front of said carriers with the edge thereof provided with a semicircular notch for each register-carrier, the curvature of said notch being substantially the same as the circles containing the party emblems so as to indicate to the voter the exact voting position.

10. In a voting-machine, a curved register-carrier revolubly mounted so that the voter may bring any register into a voting position, means for indicating the voting position, and means actuated by the machine for moving the register-carrier so as to bring the desired register to the exact voting position after it has been moved by the voter approximately to such position.

11. In a voting-machine, a curved register-carrier for the candidates of each office, means for mounting the same so it is longitudinally movable, registers secured to the side of said carrier, and a plate secured on the periphery of said carrier covering said registers.

12. In a voting-machine, a curved register-carrier for the candidates of each office, means for mounting the same so it is longitudinally movable, registers secured to the side of said carrier, means extending inward from said registers for actuating them when said means is engaged, and a plate secured to the periphery of the carrier covering said registers.

13. In a voting-machine, a curved register-carrier for the candidates of each office, means for mounting the same so it is longitudinally movable, registers secured to the side of said carrier, a plate secured to the periphery of said carrier covering said registers, and knobs secured to the carrier for revolving the same.

14. In a voting-machine, a curved register-carrier for the candidates of each office, means for mounting the same so it is longitudinally movable, registers secured to the side of said carrier, a plate secured on the periphery of said carrier covering said registers, a knob secured to the carrier opposite each of said registers for revolving the same, and a ticket on said plate with the name of the candidate between each pair of knobs.

15. In a voting-machine, a stationary drum, an annular register-carrier mounted thereon so as to be revoluble, lugs extending inward from said carrier and bearing on the surface of the drum, registers secured on the side of the carrier, an arm extending from the register inward on the side of said lugs through which the register is actuated when in the voting position, and means for engaging and actuating said arm.

16. In a voting-machine, a curved register-carrier, means on which said carrier is mounted whereby the same may be revolved to bring the desired register to the voting position, registers secured on the side of said carrier, lugs extending inward from said carrier, there being one lug for each register and said lugs being beveled on the sides opposite each other, and means movable toward the carrier between said beveled lugs for moving the carrier so as to move the desired register from the approximate to the exact voting position.

17. In a voting-machine, a stationary drum, an annular register-carrier mounted thereon outside the drum so as to be revoluble thereon, registers on said carrier which may be moved to a voting position, and means within the drum for actuating the registers when in such position.

18. In a voting-machine, a drum with an opening in it at the voting position, a register-carrier revolubly mounted thereon outside the drum that is movable by the voter to bring any desired register to the voting position, registers secured on said carrier, and means within the drum that operates through said opening for acting on the carrier and registers.

19. In a voting-machine, a register-carrier movable by the voter so as to bring the desired register approximately into the voting position, means operated by the machine for moving said carriers so as to bring the desired register into the exact voting position, and means for actuating the register when in such position.

20. In a voting-machine, a number of register-carriers mounted side by side so the voter can move them independently to bring the desired registers approximately into the voting position, a single means operated by the machine for moving said carriers to bring the desired registers into the exact voting position, and a single means for actuating the registers that are in such position.

21. In a voting-machine, a drum, an annular register-carrier revolubly mounted thereon so as to be movable by the voter to bring any desired register to the voting position, and means within the drum for engaging said carrier after the desired register has been moved approximately to the voting position and moving said carrier so as to place the register at the voting position.

22. In a voting-machine, a drum slotted longitudinally on one side at the voting position, annular register-carriers mounted revolubly on said drum side by side, registers on said carriers, a frame mounted within said drum movable toward the slot therein, means on said frame for acting on the carriers and registers, and means actuated by the pedal mechanism as the voter leaves the booth for moving said frame.

23. In a voting-machine, a drum slotted longitudinally on one side at the voting position, annular register-carriers mounted revolubly on said drum side by side, registers on said carriers, a frame mounted within said drum movable toward the slot therein, means on said frame for acting on the carriers and registers, a shaft mounted longitudinally within the drum having a finger secured to it, a bar pivoted to said frame with a shoulder resting on said finger so that said finger when revolved will actuate said frame through said bar, and means actuated by the pedal mechanism as the voter leaves the machine for actuating said shaft.

24. In a voting-machine, a drum slotted longitudinally on one side at the voting position, annular register-carriers mounted revolubly on said drum side by side, registers on said carriers, a frame mounted within said drum movable toward the slot therein, means on said frame for acting on the carriers and registers, a shaft mounted longitudinally within the drum having a finger secured to it, a bar pivoted to said frame with a shoulder resting on said finger so that said finger when revolved will actuate said frame through said bar, a sprocket-wheel secured on said shaft, a chain on said sprocket-wheel, a casing inclosing the voting mechanism, a sliding rod mounted in said casing with an arm extending therefrom connected with the sprocket-chain for actuating it, a pedal mechanism, and a bell-crank lever actuated by the pedal mechanism which in turn operates said sliding rod.

25. In a voting-machine, a drum slotted longitudinally on one side at the voting position, annular register-carriers mounted revolubly on said drum side by side, registers on said carriers, a frame mounted within said drum movable toward the slot therein, means on said frame for acting on the carriers and registers, means for mounting said frame so it will be guided in its movement, and means actuated by the pedal mechanism as the voter leaves the booth for moving said frame.

26. In a voting-machine, a drum slotted longitudinally on one side at the voting position, annular register-carriers mounted revolubly on said drum side by side, registers on said carriers, a frame mounted within said drum movable toward the slot therein, means on said frame for acting on the carriers and registers, means for mounting said frame so it will be guided in its movement, a spring acting on said movable frame for returning it to its normal position, and means actuated by the pedal mechanism as the voter leaves the booth for moving said frame.

27. In a voting-machine, a drum slotted along one side with a wooden portion mounted in and reinforcing one side thereof, annular register-carriers mounted on said drum side by side so the voter can move the desired registers into the voting position over the slot in the drum, registers secured to said carriers, a frame within the drum, means secured to the wooden part of the drum on which said frame is mounted so as to be movable toward the slot in the drum, means on said frame for acting upon the carriers and registers, and means actuated by the pedal mechanism as the voter leaves the voting-machine for moving said frame.

28. In a voting-machine, a drum, an annular register-carrier revolubly mounted thereon so as to be movable by the voter to bring any desired register to the voting position, lugs extending inwardly from the carrier, one for each register and beveled on their opposite sides, a disk mounted within the drum and movable toward the carrier and adapted to engage the beveled sides of said lugs to bring the desired register to the exact voting position, mechanism within the drum for mounting and moving said disk, and means operated by the pedal mechanism of the machine, as the voter leaves the machine for actuating said disk-actuating mechanism.

29. In a voting-machine, a drum, annular register-carriers revolubly mounted thereon side by side so as to be movable by the voter to bring the desired registers to the voting position, lugs extending inwardly from the carriers, one for each register and beveled on their opposite sides, a rod provided with a series of disks, one for each carrier, a frame extending longitudinally through the drum and movable toward the carriers and on which said disk-rod is mounted parallel with and near the carriers, and means actuated by the pedal mechanism as the voter leaves the machine for actuating said frame within the drum so that all the desired registers will be moved to the exact voting position.

30. In a voting-machine, a drum slotted longitudinally, a series of registers for an office movable across the face of the drum so the voter can bring the desired register into voting position over the slot in the drum, a register-actuator mounted in said drum operating through the slot therein for actuating the register that is in the voting position, and means actuated by the pedal mechanism as the voter leaves the voting-machine for operating said register-actuator.

31. In a voting-machine, a drum slotted longitudinally, a series of registers for each office independently movable across the face of the drum so the voter can bring the desired registers to the voting position over the slot in the drum, a single actuator for all of the registers in the voting position that is operative through the slot in the drum, and means actuated by the pedal mechanism as the voter leaves the voting-machine for operating said register-actuator.

32. In a voting-machine, a drum longitudinally slotted, register-carriers movable about said drum, registers thereon, a bar mounted within the drum so as to be oscillatory and extending longitudinally thereof and parallel with the series of carriers and having fingers extending therefrom, one for the registers on each carrier which operate through the slot in the drum for actuating all of the registers that have been moved into the voting position, an arm extending from said actuator-bar, a frame mounted within the drum so as to be movable toward and from the slot therein, a bar pivotally connecting said frame with the arm of the actuator-bar, and means operated by the pedal mechanism as the voter leaves the machine for actuating said frame.

33. In a voting-machine, a drum longitudinally slotted, register-carriers movable about said drum, registers thereon, a bar mounted within the drum so as to be oscillatory and extending longitudinally thereof and parallel with the series of carriers and having fingers extending therefrom, one for the registers on each carrier, which operate through the slot in the drum for actuating all of the registers that have been moved to the voting position, an arm extending from said actuator-bar, a frame mounted within the drum so as to be movable toward and from the slot therein, a bar pivotally connecting said frame with the arm of the actuator-bar, a shaft mounted within and longitudinally of the drum having a finger on it, a bar pivoted to said movable frame with a shoulder resting on said finger so that when said finger is revolved it will move said connecting-bar and frame toward the slot in the drum, and means for adjusting the position of said connecting-bar upon the finger of said shaft so as to predetermine the extent of movement of said movable frame, and means operative by the pedal mechanism as the voter leaves the machine for actuating said shaft, whereby the throw of the register-actuators may be adjusted.

34. In a voting-machine, a drum with an opening therein, a series of registers movable over the face of the drum by the voter so as to bring the desired register into a voting position over said slot, means for accurately placing said register after the voter has brought it to the approximate voting position, means for actuating the register when in such position, and a single means for actuating said register-actuator, and the means for accurately placing the register.

35. In a voting-machine, a plurality of drums, register-carriers mounted thereon, registers on said carriers, means within the drums for acting on said carriers and registers, and a single means operated by the pedal mechanism as the voter leaves the machine for actuating said mechanism within all the drums.

36. In a voting-machine, a plurality of drums, register-carriers mounted thereon, registers on said carriers, means within the drums for acting on said carriers and registers, a shaft in each drum for actuating said means, a sprocket-wheel on each of said shafts, a sprocket-chain running over said sprocket-wheels, a casing in which said mechanism is mounted, a sliding rod mounted on said casing with an arm secured to said chain, a bell-crank lever for operating said sliding rod, and a pedal mechanism operated by the voter as he leaves the machine for actuating said bell-crank lever.

37. In a voting-machine, a series of annular register-carriers, one for each office, mounted side by side that are independently revoluble by the voter to bring the desired registers into a voting position, a pin projecting from each of said carriers, an oscillatory bar extending parallel of the series of carriers which when moved engages the pins on the carriers and simultaneously revolves all of said carriers, and means controlled by the voter for moving said bar, whereby with one movement the registers may be put in place for voting a straight ticket.

38. In a voting-machine, a drum with a transverse recess or slot near the middle thereof on one side, a number of register-carriers revolubly mounted on the drum side by side and independently movable to bring the desired registers into the voting position, a pin extending radially outward from each carrier, a shaft mounted centrally within the drum, an arm extending from said shaft through the recess in the drum beyond the periphery of the drum, a bar secured on the outer end of said arm that engages the pins on the carriers and when operated simultaneously moves all of said carriers so as to bring the desired register into position to vote a straight ticket, and a crank-wheel secured on said shaft in position to be operated by the voter.

39. In a voting-machine, a drum with a transverse recess or slot near the middle thereof on one side, a number of register-carriers revolubly mounted on the drum side by side and independently movable to bring the desired registers into the voting position, a pin extending radially outward from each carrier, a shaft mounted centrally within the drum, an arm extending from said shaft through the recess in the drum beyond the periphery of the drum, a bar secured on the outer end of said arm that engages the pins on the carriers and when operated simultaneously moves all of said carriers so as to bring the desired register into position to vote a straight ticket, a crank-wheel secured on said shaft in position to be operated by the voter, means adjacent said wheel for indicating to the voter the voting position, and party emblems placed on said wheel in the proper position to register with said indicating means whenever the corresponding emblems on the register-carriers reach the voting position.

40. In a voting-machine, drums with transverse recesses or slots near the middle thereof on one side, a number of register-carriers revolubly mounted on each drum side by side and independently movable to bring the desired registers into voting position, pins extending radially outward from each carrier, a shaft mounted centrally within each drum, an arm extending from said shaft through the recess in each drum beyond the periphery of each drum, a bar secured on the outer end of each drum that engages the pins on the carriers and when operated simultaneously moves all of said carriers so as to bring the desired registers into position to vote a straight ticket, a crank-wheel secured on one of said shafts in position to be operated by the voter, a sprocket-wheel on each of the shafts, and a sprocket-chain running over said wheels so that a straight ticket can be voted on all of said drums by operating the single crank-wheel.

41. In a voting-machine, a drum, register-carriers revolubly mounted thereon so as to be movable to bring the desired registers into the voting position, registers on said carriers, means within the drum for acting on said registers and carriers, a tubular shaft mounted centrally within the drum and extending only partially through the same longitudinally for actuating said means, means operated by the pedal mechanism as the voter leaves the voting-machine for actuating said tubular shaft, another shaft extending loosely through said tubular shaft, an arm beyond the end of the tubular shaft extending from said inner shaft radially outward, a straight-ticket bar secured on said arm, pins on the register-carriers for it to engage, and means controlled by the voter for operating said straight-ticket bar.

42. In a voting-machine, a series of annular register-carriers mounted revolubly side by side, pins extending radially from each carrier, a resetting-bar extending across said carriers and close thereto, a radially-extending arm to which said resetting-bar is secured, and means operated by the pedal mechanism as the voter leaves the booth for returning the register-carriers to their normal position.

43. In a voting-machine, a drum, a number of annular register-carriers independently revoluble thereon, pins extending from said carriers, a shaft centrally located in the drum, a radially-extending arm from said shaft beyond the drum and the register-carriers, a bar secured to the outer end of said arm across said carriers and close thereto, and means for turning said shaft for resetting the register-carriers.

44. In a voting-machine, a drum with a radial slot or recess about midway thereon and on one side, a number of annular register-carriers independently and revolubly mounted on said drum, pins extending from said carriers, a shaft extending centrally into said drum to a point about midway thereof, an arm extending from said shaft that is oscillatory in said slot or recess in the drum, a bar on the outer end of the arm that extends across the carriers and close thereto, and means for oscillating said shaft for resetting the register-carriers.

45. In a voting-machine, a plurality of drums, a number of annular register-carriers independently and revolubly mounted on each of said drums, pins extending from said carriers, a bar extending across the series of carriers on each drum, and a single means for revolving said bar for all of said drums for engaging the pins on the carriers thereon and resetting the same.

46. In a voting-machine, a plurality of drums, a number of annular register-carriers independently and revolubly mounted on each drum, pins extending from said carriers, a shaft extending centrally into each drum, an arm extending from each shaft radially, a bar extending across said carriers on each drum and close thereto that is secured upon said arm, a sprocket-wheel on each of said shafts, a chain connecting said sprocket-wheels, a pedal mechanism, and means actuated by the pedal mechanism for moving said chain, whereby all of said register-carriers will be simultaneously reset.

47. In a voting-machine, a register-carrier movable by the voter to bring the desired register into the voting position, registers thereon, a pin on said carrier, means for actuating the register that is in the voting position, a movable bar extending across said carrier and adapted to engage said pin and return the carrier to its normal position, and a single means for operating the register-actuator and moving said returning-bar, said pin being so located on said carrier that it will not be engaged by the returning-bar until after the register has been actuated.

48. In a voting-machine, register-carriers independently movable by the voter to bring the desired register to the voting position, registers thereon, pins on said carriers, a single means for actuating the registers that are in the voting position, a movable bar extending across the series of carriers and close thereto and adapted to engage the pins thereon to return said carriers to their normal position, means for operating the register-actuator and moving said returning-bar, said pins being so located on said carriers that they will not be engaged by the returning-bar until after the registers have been actuated.

49. In a voting-machine, a curved register-carrier with a radially-extending flange on one side thereof, registers mounted on the side of said flange having a suitable casing with a slot in the outer wall thereof through which the numerals on the registering mechanism may be read, a plate mounted on the periphery of said carrier-flange over said registers with a series of openings through it that correspond with the openings in the register-casings, and means for securing said plate to said carrier in a slightly-changed position so that the openings through it will not correspond with the openings through the register-casings.

50. In a voting-machine, a movable register-carrier, registers thereon for the regular candidates for an office, an independent-vote-record mechanism for such office, and means for preventing the movement of said carrier by the voter after the independent-vote-record mechanism has been used.

51. In a voting-machine, a register-carrier movable by the voter to bring the desired register into the voting position, registers thereon for the regular candidates for an office, an independent-vote-record mechanism thereon for voting for an independent candidate for such office, means for preventing the use of the independent-vote-record mechanism until the register-carrier has been moved far enough to cause all the registers for the regular candidates to pass beyond the voting position, and means for preventing the movement of said carrier by the voter after the independent-vote-record mechanism has been used and before he leaves the machine.

52. In a voting-machine, a movable register-carrier, registers secured thereto for the regular candidates for an office, an independent-vote-record mechanism secured thereto for an independent candidate for such office, means for stopping the forward movement of the register-carrier after the regular candidates have been moved past the voting position, and means operated by the independent-vote-record mechanism when the same is used for preventing the return movement of said register before the voter leaves the machine.

53. In a voting-machine, a drum with a longitudinal slot therein at the voting position, a number of curved register-carriers revoluble thereon, registers for regular candidates for an office secured to each carrier, an independent-vote-record mechanism for voting for independent candidates for each office secured to the carrier somewhat removed from the registers for the regular candidates, a bar extending across the series of register-carriers in a position to stop the movement of the register-carriers after the registers for the regular candidates have passed beyond the voting position, and means actuated by the independent-vote-record mechanism when used for preventing the return movement of the carrier to which said register is secured before the voter leaves the machine.

54. In a voting-machine, a drum with a longitudinal slot therein at the voting position, a number of curved register-carriers revoluble thereon, registers for the regular candidates for an office secured to each carrier, an independent-vote-record mechanism for voting for independent candidates for each office secured to the carrier somewhat removed from the registers for the regular candidates, a bar extending across the series of register-carriers in a position to stop the movement of the register-carriers after the registers for the regular candidates have passed beyond the voting position, means actuated by the independent-vote-record mechanism when used for preventing the return movement of the carrier to which said register is secured before the voter leaves the machine, and a single means actuated by the voter as he leaves the booth for releasing each of said register-carriers and returning the same to the unoperated position.

55. In a voting-machine, a group-voting mechanism consisting of register-carriers independently movable by the voter into voting position, registers on said carriers, means for actuating a plurality of registers on any of said carriers, and means for limiting the number of registers that can be actuated on the whole number of carriers in said group-voting mechanism.

56. In a voting-machine, a group-voting mechanism consisting of a drum with a longitudinal slot through it, curved register-carriers revoluble thereon, registers secured to said carriers, means operated through the slot in the drum for actuating any register in position to be actuated, a rocking frame mounted within said drum, springs thereon adapted to actuate the registers, radially-extending movable rods near each register for holding said springs out of position to actuate the registers, a cable connected with the inner ends of all of said rods in the grouping mechanism having sufficient slack to permit only the desired number of registers to be actuated, and means connecting the rocking frame with the register-actuating mechanism that operates through said slot in the drum.

57. In a voting-machine, a group-voting mechanism consisting of a drum slotted longitudinally, curved register-carriers revolubly mounted thereon, registers on said carriers, means operative through the slot in the drum for actuating the registers over said slot, a cable in the drum, means for limiting the amount of slack therein, and means connected with said cable that is actuated by said register-carriers when moved so that each register when moved will take up a proportionate amount of slack in said cable.

58. In a voting-machine, a group-voting mechanism consisting of a drum slotted longitudinally, curved register-carriers revolubly mounted thereon, registers on said carriers, means operative through the slot of the drum for actuating the registers over said slot, a cable in the drum, means for limiting the amount of slack therein, a lever pivotally mounted on the drum adjacent each of said carriers, a connection between each lever and the cable, and means on each carrier for actuating said lever when the carrier is moved, whereby the movement of each carrier will take up a certain amount of slack in each cable.

59. In a voting-machine, a group-voting mechanism consisting of a drum slotted longitudinally, curved register-carriers revolubly mounted thereon and having a recess in the inner surface of each, registers on said carriers, means operative through the slot of the drum for actuating the registers over said slot, a cable in the drum, means for limiting the amount of slack therein, a lever pivotally mounted on the drum adjacent each of said carriers and adapted to extend into the recess in said carrier when the carrier is in its unoperated position, and a connection between each lever and the cable, whereby the movement of each carrier will actuate said lever and will take up a proportionate amount of slack in said cable.

60. In a voting-machine, a group-voting mechanism consisting of a drum slotted longitudinally, curved register-carriers revolubly mounted thereon, registers on said carriers, means operative through the slot of the drum for actuating the registers over said slot, a cable in the drum, means limiting the amount of slack therein, a lever pivotally mounted on the drum adjacent each of said carriers, a connection between each lever and the cable, means on each carrier for actuating said levers when the carrier is moved, a rocking frame in said drum connected with and actuated by the actuator that operates through the slot in the drum, springs secured to said frame for actuating each of the registers on the carriers excepting the one over the slot in the drum, said springs being normally in position to actuate said registers, rods extending through the carriers near each register for moving said springs into position to actuate the desired registers, said rods being connected with said cables so that the movement thereof will take up a proportionate amount of slack in said cable.

61. In a voting-machine, a group-voting mechanism consisting of a drum slotted longitudinally, curved register-carriers revolubly mounted thereon, registers on said carriers, means operative through the slot of the drum for actuating the registers over said slot, a cable in the drum, means limiting the amount of slack therein, a lever pivotally mounted on the drum adjacent each of said carriers, a connection between each lever and the cable, means on each carrier for actuating said levers when the carrier is moved, a rocking frame in said drum connected with and actuated by the actuator that operates through the slot in the drum, springs secured to said frame for actuating each of the registers on the carriers excepting the one over the slot in the drum, said springs being normally in position to actuate said registers, rods extending through the carriers near each register for moving said springs into position to actuate the desired registers, said rods being connected with said cable so that the movement thereof will take up a proportionate amount of slack in said cable, and a metal plate placed within the drum and rocking frame provided with slots through which said cable and rods may pass.

62. In a voting-machine, a group-voting mechanism consisting of a drum slotted longitudinally, curved register-carriers revolubly mounted thereon, registers on said carriers, means operative through the slot of the drum for actuating the registers over said slot, a cable in the drum, means limiting the amount of slack therein, a lever pivotally mounted on the drum adjacent each of said carriers, a connection between each lever and the cable, means on each carrier for actuating said levers when the carrier is moved, a rocking frame in said drum connected with and actuated by the actuator that operates through the slot in the drum, springs secured to said frame for actuating each of the registers on the carriers excepting the one over the slot in the drum, said springs being normally in position to actuate said registers, rods extending through the carriers near each register for moving said springs into position to actuate the desired registers, said rods being connected with said cable so that the movement thereof will take up a proportionate amount of slack in said cable, a metal plate placed within the drum and rocking frame provided with slots through which said cable and rods may pass, and means operated by the voter as he leaves the machine for actuating said register-actuator and rocking frame.

In witness whereof I have hereunto affixed my signature in the presence of the witnesses herein named.

JOHN B. MAHANA.

Witnesses:
V. H. LOCKWOOD,
NELLIE ALLEMONG.